(12) United States Patent
Oh

(10) Patent No.: US 10,948,875 B2
(45) Date of Patent: Mar. 16, 2021

(54) METHOD AND APPARATUS FOR CONVERTING RESOLUTION OF DIGITAL HOLOGRAM DATA

(71) Applicant: ELECTRONICS AND TELECOMMUNICATIONS RESEARCH INSTITUTE, Daejeon (KR)

(72) Inventor: Kwan-Jung Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 51 days.

(21) Appl. No.: 15/868,692

(22) Filed: Jan. 11, 2018

(65) Prior Publication Data

US 2018/0267466 A1 Sep. 20, 2018

(30) Foreign Application Priority Data

Mar. 16, 2017 (KR) .................. 10-2017-0033340

(51) Int. Cl.
*G03H 1/08* (2006.01)
*G03H 1/04* (2006.01)
*G03H 1/00* (2006.01)

(52) U.S. Cl.
CPC ......... *G03H 1/0808* (2013.01); *G03H 1/0443* (2013.01); *G03H 1/0841* (2013.01); *G03H 1/0866* (2013.01); *G03H 2001/0088* (2013.01); *G03H 2001/0825* (2013.01); *G03H 2240/56* (2013.01)

(58) Field of Classification Search
CPC ........ G02B 5/32; G02B 5/1876; G02B 5/203; G03H 1/08; G03H 1/16; G03H 1/2202; G03H 1/0808; G03H 1/0866; G03H 1/0443; G03H 1/0841; G03H 2001/0088; G03H 2001/0825; G03H 2240/56; G06T 9/00; G06T 3/40; G06T 7/00; G06T 3/4007; G06T 3/4084; G06T 3/4076; G06T 7/0075
USPC .................................... 359/9, 22–25, 29, 32
See application file for complete search history.

(56) References Cited

U.S. PATENT DOCUMENTS

| 2014/0085692 A1 | 3/2014 | Lee et al. |
| 2014/0313555 A1 | 10/2014 | Oh et al. |
| 2017/0038727 A1 | 2/2017 | Kim et al. |

FOREIGN PATENT DOCUMENTS

| JP | 2010-283508 A | 12/2010 |
| KR | 1020130021542 A | 3/2013 |
| KR | 10-2017-0016158 A | 2/2017 |

*Primary Examiner* — Jie Lei

(57) ABSTRACT

Provided is a method for converting a hologram resolution of an apparatus for converting a hologram resolution. The apparatus for converting a hologram resolution includes receiving a hologram data and determining a direction and a height of an envelope for the hologram data based on first information associated with the hologram data. The apparatus for converting a hologram resolution includes converting the resolution of the hologram data from a first resolution into a second resolution based on the envelop having the determined direction and height.

6 Claims, 15 Drawing Sheets

2D IMAGE

HOLOGRAM IMAGE (REAL PART)

METHOD AND APPARATUS FOR CONVERTING RESOLUTION OF DIGITAL HOLOGRAM DATA

CROSS-REFERENCE TO RELATED APPLICATION

This application claims priority to and the benefit of Korean Patent Application No. 10-2017-0033340 filed in the Korean Intellectual Property Office on Mar. 16, 2017, the entire contents of which are incorporated herein by reference.

BACKGROUND OF THE INVENTION (a) Field of the Invention

The present invention relates to a method and an apparatus for converting a resolution of a digital hologram data. More specifically, the present invention relates to a method and an apparatus for converting a resolution required for a digital holographic image service.

(b) Description of the Related Art

Holography is a technology of using a refraction and interference phenomenon of light, and uses phase information of light unlike the existing two dimensional (2D) image that records only amplitude information of light. As a result, the holography is a technology capable of providing a complete three dimensional (3D) image like looking a real thing and is an ultimate 3D imaging technology.

There are a method for directly acquiring a digital hologram image for a digital holographic image service and a method for acquiring a digital hologram image based on a numerical calculation using a computer generated hologram (CGH).

The acquired digital hologram has both of the amplitude information and the phase information, and therefore is generally represented by a complex value.

In the case of the holographic display, generally, a spatial light modulator (SLM) is used, in which a pixel pitch of the spatial light modulator (SLM) has an inversely proportional relationship with a viewing angle of the holographic display. Actually, in the case of a pixel pitch of 1 µm, the viewing angle of approximately 30° is provided.

Therefore, in the case of the holographic display that a user can comfortably view, the pixel pitch needs to be smaller than 1 µm. In other words, the resolution of the display needs to be increased very greatly.

In the case of televisions (TVs) supporting a pixel pitch of about 100 µm and a 4K resolution which are commonly used in homes today, if the same size holographic display has a pixel pitch of 1 µm, the resolution should be 100 times larger in both the horizontal and vertical directions. That is, the 400K resolution needs to be supported. To this end, the hologram resolution also input needs to be increased to 400K.

However, the high resolution hologram generation needs many resources. In addition, the holographic display may support different resolutions. Therefore, a need exists for a method for effectively converting a hologram resolution according to the resolution between the low resolution hologram and the high resolution hologram.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for efficiently converting a hologram resolution according to characteristics of hologram.

An exemplary embodiment of the present invention provides a method for converting a hologram resolution of an apparatus for converting a hologram resolution. The method for converting a hologram resolution of an apparatus for converting a hologram resolution includes: receiving a hologram data; determining a direction and a height of an envelope for the hologram data based on first information associated with the hologram data; and converting the resolution of the hologram data from a first resolution into a second resolution based on an envelope having the determined direction and height.

The determining of the direction and height of the envelope for the hologram data may include: determining the direction and height of the envelope as a first candidate value based on the first information; applying a first resolution conversion based on the envelope to which the first candidate value is applied to the hologram data having the first resolution; and restoring a first image based on a numerical restoration for the hologram data to which the first resolution conversion is applied.

The determining of the direction and height of the envelope for the hologram data may further include: restoring a second image based on a numerical restoration for the hologram data having the first resolution; and changing the direction and height of the envelope from the first candidate value to a second candidate value based on a correlation between the first image and the second image.

The applying of the first resolution conversion to the hologram data having the first resolution may include: applying the first resolution conversion only to some area of the hologram data having the first resolution.

The converting of the resolution of the hologram data from the first resolution into the second resolution may include: applying the resolution conversion only to some area of the hologram data.

The first information may include at least one of a resolution, a pixel pitch, a wavelength and a reproduction distance.

Another exemplary embodiment of the present invention provides a method for converting a hologram resolution of an apparatus for converting a hologram resolution. The method for converting a hologram resolution of an apparatus for converting a hologram resolution includes: receiving a hologram data; determining sizes of partition regions for a resolution conversion based on first information associated with the hologram data; converting a domain for the hologram data from a hologram domain into a frequency domain by applying a frequency conversion to the hologram data; and applying the resolution conversion to each of the partition regions included in the hologram data of the frequency domain.

The method may further include: performing an inverse conversion on a domain for the hologram data to which the resolution conversion is applied from a frequency domain into a hologram domain.

The applying of the resolution conversion to each of the partition regions may include: applying the resolution conversion only to some of the partition regions.

The determining of the sizes of the partition regions for the resolution conversion may include: restoring a first image based on a numerical restoration for the hologram data; determining the sizes of the partition regions as a first candidate value based on the first information; and applying a first resolution conversion based on the partition regions to which the first candidate value is applied to the hologram data.

The determining of the sizes of the partition regions for the resolution conversion may include: restoring a second image based on a numerical restoration for the hologram data to which the first resolution conversion is applied; and changing the sizes of the partition regions from the first candidate value to a second candidate value based on a correlation between the first image and the second image.

Still another exemplary embodiment of the present invention provides a method for converting a hologram resolution of an apparatus for converting a hologram resolution. The method for converting a hologram resolution of an apparatus for converting a hologram resolution includes: receiving a hologram data having a first resolution; configuring hologram vectors having a real part and an imaginary part of the hologram data as an axis component; and applying to the hologram data a resolution conversion based on one of a first vector prediction method for predicting a new hologram vector using sizes and angles of the hologram vectors and a second vector prediction method for predicting a new hologram vector based on real parts and imaginary parts of the hologram vectors.

The hologram vectors may include a plurality of second hologram vectors used to predict a first hologram vector.

The first vector prediction method may obtain a first average value by averaging sizes of the plurality of second hologram vectors, obtain a second average value by averaging angles of the plurality of second hologram vectors, and obtain a real part and an imaginary part of the first hologram vector based on the first average value and the second average value.

The second vector prediction method may obtain a first average value by averaging the real parts of the plurality of second hologram vectors, obtain a second average value by averaging the imaginary parts of the plurality of second hologram vectors, and obtain the first hologram vector having the first average value and the second average value as the real part and the imaginary part.

The applying of the resolution conversion to the hologram data may include determining a hologram vector combination for predicting a new hologram vector among the hologram vectors.

The determining of the hologram vector combination may include: determining a first hologram vector combination based on first information associated with the hologram data; applying a first resolution conversion based on the first vector prediction method to which the first hologram vector combination is applied to the hologram data having the first resolution; and restoring a first image based on a numerical restoration for the hologram data to which the first resolution conversion is applied.

The determining of the hologram vector combination may further include: restoring a second image based on a numerical restoration for the hologram data having the first resolution; and determining a second hologram vector combination based on a correlation between the first image and the second image.

The configuring of the hologram vectors may include: converting a domain for the hologram data from a hologram domain into a frequency domain by applying a frequency conversion to the hologram data.

The applying of the resolution conversion to the hologram data may include applying the resolution conversion to each of the partition regions included in the hologram data of the frequency domain.

The applying of the resolution conversion to the hologram data may further include determining sizes of partition regions based on first information associated with the hologram data.

The hologram image may have characteristics different from the existing 2D image and the characteristics of the hologram image data may be changed depending on a pixel pitch, a wavelength, a resolution, or the like of the hologram display. Accordingly, there is a need for the method for effectively converting a resolution in consideration of the characteristics.

The correlation between the hologram resolution and the wavelength (or pixel pitch) based on the physical phenomenon is confirmed and the detailed resolution conversion method is required.

According to an exemplary embodiment of the present invention, various methods for converting a resolution based on the experimental approach may be provided.

According to an exemplary embodiment of the present invention, it is possible to effectively process the high resolution hologram which is the essential technology for the digital holographic image service.

The method and apparatus according to the exemplary embodiment of the present invention is highly likely to be utilized for the technology of generating and processing the high resolution digital hologram.

The method and apparatus according to the exemplary embodiment of the present invention is highly likely to be utilized for the hologram data compression technology.

DETAILED DESCRIPTION OF THE EMBODIMENTS

Figure 1:
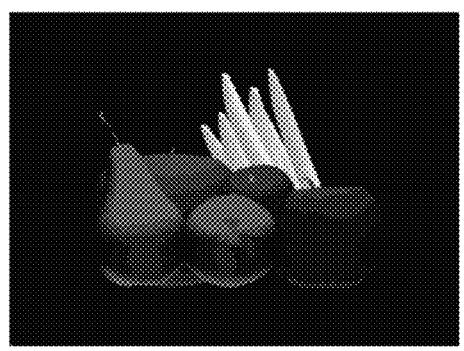
FIGS. 1 and 2 are diagrams illustrating a comparison between a 2D image and a hologram image.
Figure 1:
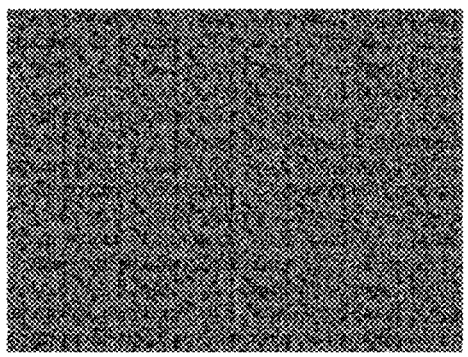

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

A digital hologram data is represented by a complex value having values of a real part and an imaginary part. In addition, a spatial correlation of the digital hologram data has different features from a general 2D image. Accordingly, in the case of the resolution conversion for the digital hologram, a need exists for a new method for converting a resolution instead of the technologies used in the existing one dimensional (1D) or 2D. Hereinafter, a method and an apparatus for efficiently converting a digital hologram resolution according to characteristics of a digital hologram data will be described.

Figure 2:
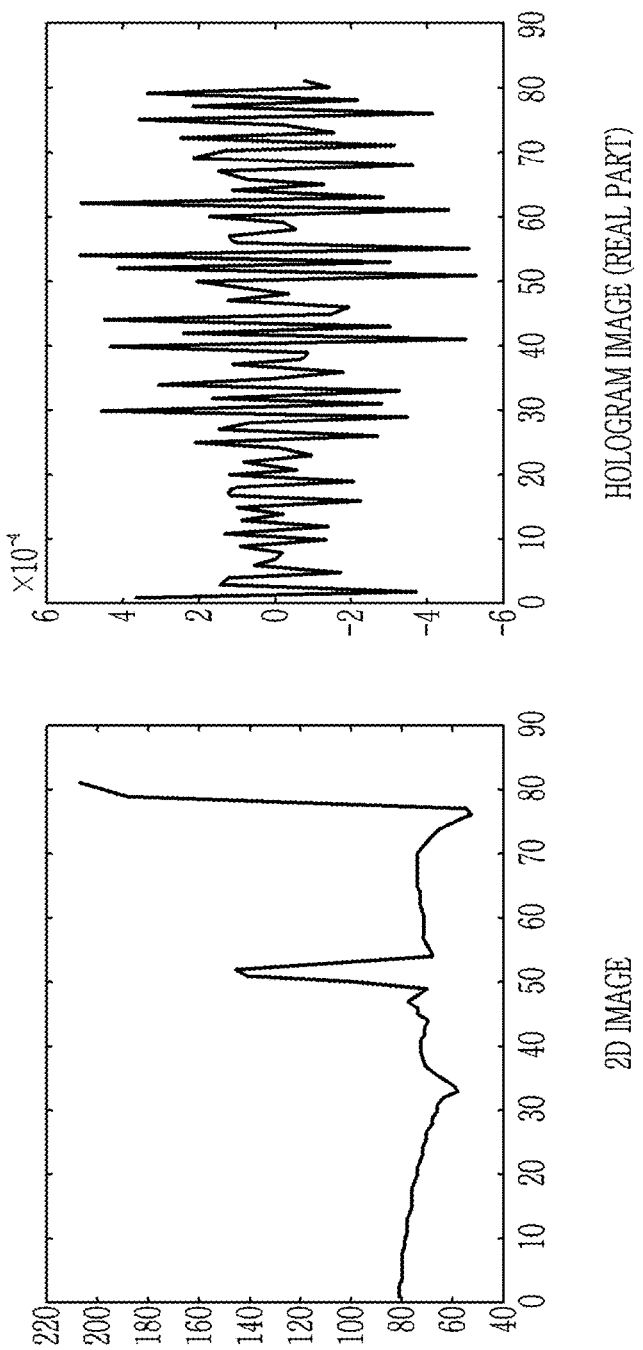

FIGS. 1 and 2 are diagrams illustrating a comparison between a 2D image and a hologram image. FIG. 1 illustrates a 2D data, and FIG. 2 illustrates a 1D data.

As a technique which is often used for the resolution conversion of a 2D digital image, there are an interpolation technique or a sampling technique. Generally, an averaging based filter is mainly used during the interpolation process and the sampling process. This is basically based on the premise that the spatial correlation of the 2D data is high.

However, the hologram has the spatial correlation of a form different from the existing 2D image.

FIG. 1 illustrates the general 2D image and the hologram image for the corresponding 2D shape.

As illustrated in FIG. 1, generally, the hologram image has the spatial correlation lower than that of the 2D image and little has the characteristics of the 2D image.

FIG. 2 illustrates a data (e.g., 1D data) for one horizontal stripe of the image illustrated in FIG. 1.

As illustrated in FIG. 2, in the case of the 2D image, the correlation between adjacent pixels is high, whereas in the case of the hologram image, a change in value is large.

Figure 3:
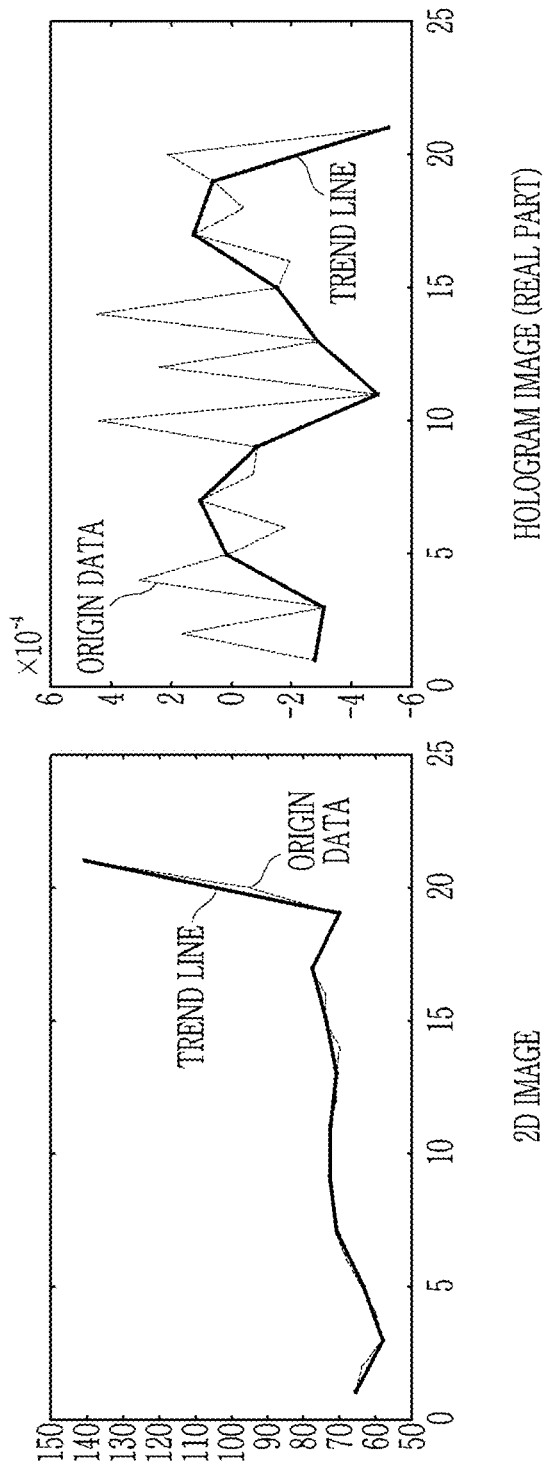
FIG. 3 is a diagram illustrating an interpolation value for a 2D image and an origin data and an interpolation value for a hologram image and an origin data.

FIG. 3 is a diagram illustrating an interpolation value for a 2D image and an origin data and an interpolation value for a hologram image and an origin data. FIG. 3 illustrates the 1D data.

In detail, FIG. 3 illustrates a result of comparing a prediction value of an average value between adjacent samples with an origin data, with respect to 21 samples extracted from the data illustrated in FIG. 2.

As illustrated in FIG. 3, in the case of the 2D image, a trend line is similar to the origin data, but in the case of the hologram image, the trend line is greatly different from the origin data. Accordingly, since the characteristics of the hologram image are different from those of the 2D image, the interpolation technique based on the existing averaging method is not suitable for the hologram image. Therefore, the method for converting a resolution suitable for the digital hologram is required.

Figure 4:
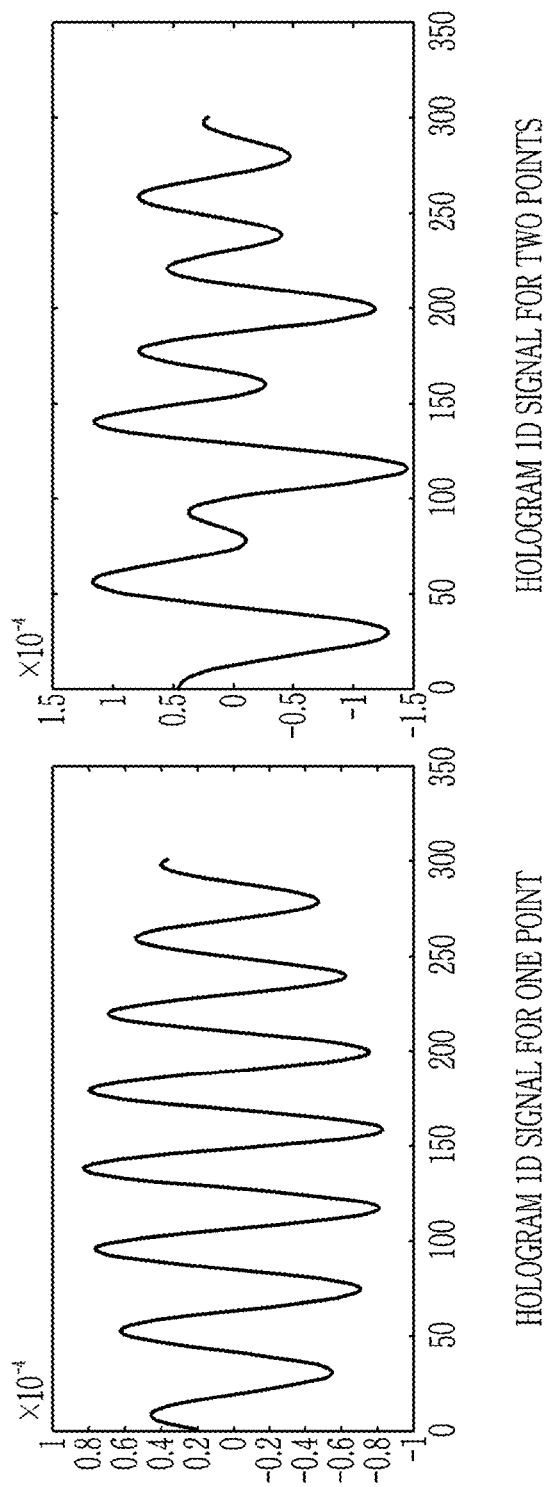
FIG. 4 is a diagram illustrating hologram image information for one point and hologram image information for two points.

FIG. 4 is a diagram illustrating hologram image information (e.g., real part) for one point and hologram image information (e.g., real part) for two points.

In detail, FIG. 4 illustrates the hologram data (e.g., 1D signal) for one point and the hologram data (e.g., 1D signal) for two points.

As the form of the signal illustrated in FIG. 4, there is a form (e.g., envelope form or the like) in which a signal having a form similar to a sine wave moves with a certain periodicity. This has characteristics similar to the case where one point is represented by a sinc function in the frequency domain. Here, the sinc function is a function represented by a ratio of a sine function and a variable of the sine function.

The hologram is a data that is represented by superposing information of light spreading like a wave, and therefore has a form in which several hologram information on one point illustrated in FIG. 4 gathers to be superposed. Accordingly, the superposed data also holds the characteristics to some extent. Reviewing the hologram data illustrated in FIG. 2 or 3, it can be seen that the characteristics remain to some extent.

Therefore, considering the characteristics, the performance of the interpolation technique or the sampling technique may be improved. In this case, the periodic characteristics of the envelope are changed depending on a pixel pitch, a wavelength, a reproduction distance, or a resolution of the hologram. A structure of the envelope-based hologram resolution conversion will be described with reference to FIG. 5.

Figure 5:
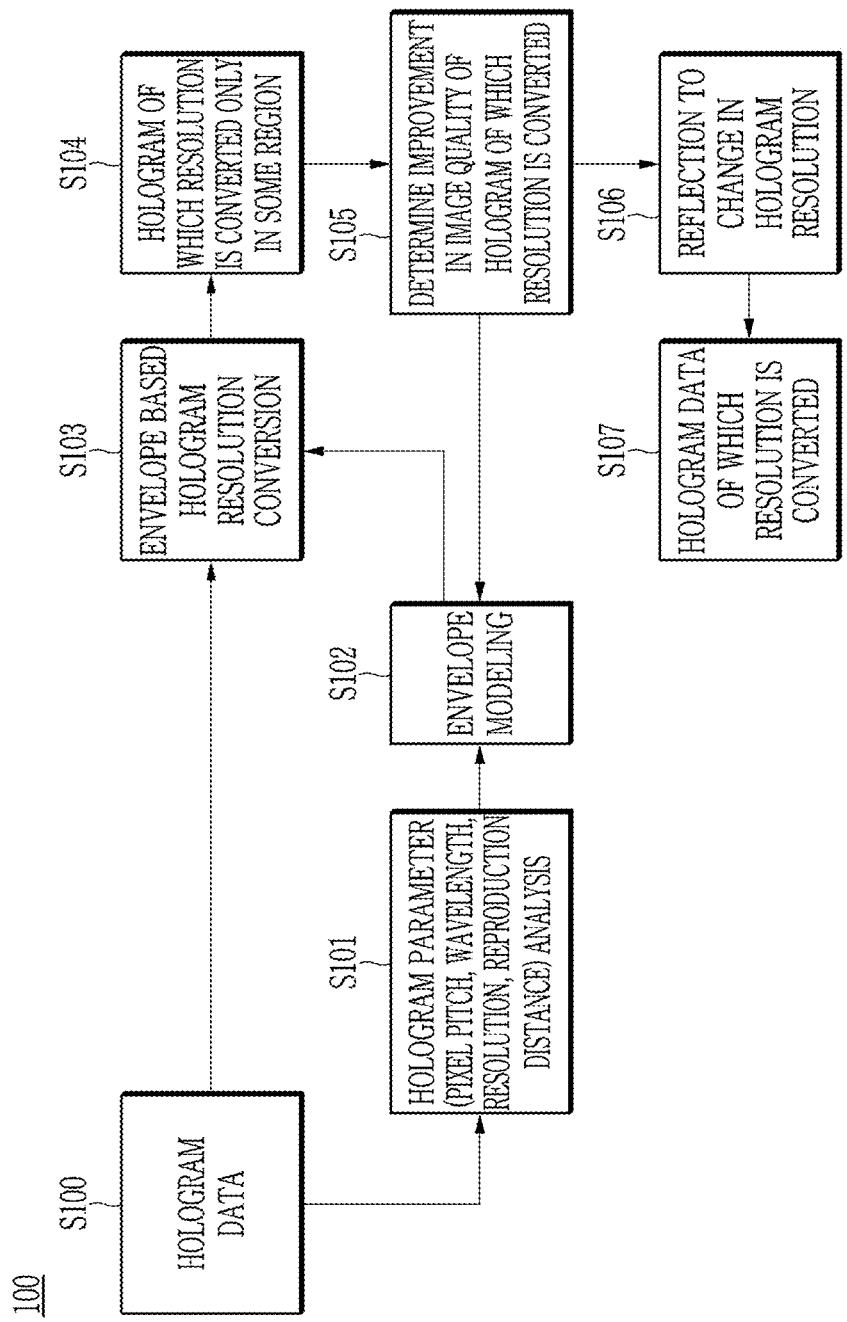
FIG. 5 is a diagram illustrating a method for converting a hologram resolution based on an envelope of a hologram data.

FIG. 5 is a diagram illustrating a method for converting a hologram resolution based on an envelope of a hologram data.

An apparatus 100 for converting a hologram resolution illustrated in FIG. 5 receives a hologram data (S100). Here, the hologram data is a data that includes all or some of complex field information on the hologram and may be a matrix data, a text data, or an image data.

The apparatus 100 for converting a hologram resolution may analyze hologram parameters (additional information or meta data) associated with the hologram data (S101). The hologram parameters (additional information or meta data) may include a resolution, a pixel pitch, a wavelength, a reproduction distance, or the like.

The apparatus 100 for converting a hologram resolution may model the envelope more finely or more sparsely depending on the hologram parameters (additional information or meta data) (S102). Here, the envelope for the hologram data depends on the characteristics of the hologram data described with reference to FIGS. 2 and 3.

In detail, the apparatus 100 for converting a hologram resolution may determine the direction and size of the envelope in consideration of the tendency of the envelope depending on the origin hologram data (S102). For example, when the apparatus 100 for converting a hologram resolution enlarges the hologram resolution twice, the direction (or sign) of the envelope for the data to be interpolated (or data to be filled by the interpolation) may be determined as an upward direction (convex upward) or a downward direction (convex downward).

The apparatus 100 for converting a hologram resolution performs the resolution conversion depending on the determined envelope direction (S103) and generates the hologram (or hologram data) of which the resolution is converted (S104). For example, the apparatus 100 for converting a hologram resolution may also apply the resolution conversion to the entire hologram data or apply the resolution conversion only to some area of the hologram data.

The apparatus 100 for converting a hologram resolution may determine improvement in quality (e.g., image quality, or the like) of the hologram of which the resolution is converted (S105) and determine whether the determined envelope direction is an appropriate direction. Here, the apparatus 100 for converting a hologram resolution may determine the value of the interpolation position (data to be interpolated) as a value other than an intermediate value of adjacent data. If it is determined that the determined direction is not the proper direction, the image quality may rather deteriorate, and therefore the apparatus 100 for converting a hologram resolution may determine a more similar envelope direction (e.g., envelope direction in which the correlation between numerically restored images is increased) as an appropriate direction in consideration of the correlation between the numerically restored images from the hologram of the origin resolution (e.g., resolution before the resolution conversion) and the numerically restored image from the hologram of which the resolution is converted. The apparatus 100 for converting a hologram resolution may repeatedly perform steps S102 to S105 to determine the optimum value for the envelope direction. The numerical restoration is a method for confirming a hologram data based image based on a computer simulation. The numerical restoration is differentiated from an optical restoration that forms the hologram data based image on an actual space.

By the similar method, the apparatus 100 for converting a hologram resolution may determine the optimum value for the envelope size (e.g., envelope height). That is, the apparatus 100 for converting a hologram resolution may determine the optimum value for the envelope height by the method similar to the method for determining an optimum value for an envelope direction described above. Due to the characteristics of the hologram data, the intermediate value is highly likely to be a value larger or smaller that the peripheral value thereof. Therefore, the apparatus 100 for converting a hologram resolution may apply the resolution conversion based on candidate values for the envelope height only to some area of the entire hologram data, and determine the optimum value among the candidate values for the envelope height in consideration of the correlation between the numerically restored image result from the hologram of the origin resolution and the numerically restored image result from the hologram of which the resolution is converted. The apparatus 100 for converting a hologram resolution may repeatedly perform steps S102 to S105 to determine the optimum value for the envelope direction.

The apparatus 100 for converting a hologram resolution converts the resolution of the hologram data from a first value into a second value by using the optimum value of the envelope direction and the envelope height (S106). For example, the apparatus 100 for converting a hologram resolution may also apply the resolution conversion to the entire hologram data or apply the resolution conversion only to some area of the entire hologram data.

The apparatus 100 for converting a hologram resolution may finally output the hologram data of which the resolution is changed (S107). For example, the hologram data of which the resolution is changed may be finally represented in an input data form. The hologram data of which the resolution is changed may be finally transmitted to another apparatus.

Figure 6A:
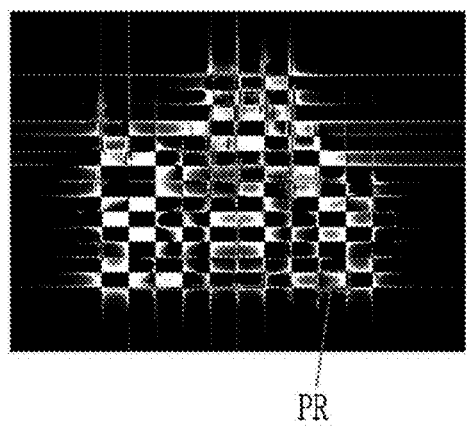
FIGS. 6A and 6B are diagrams illustrating a frequency conversion (e.g., Fourier transform) for the hologram data.
Figure 6B:
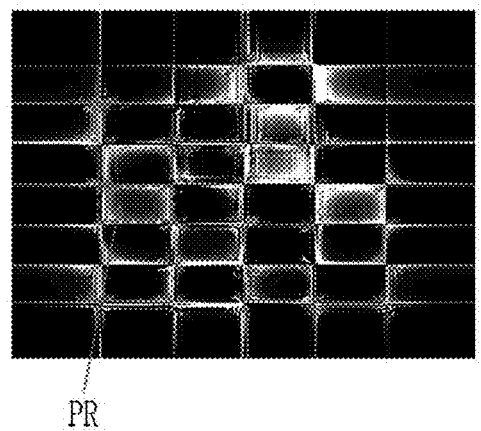

FIGS. 6A and 6B are diagrams illustrating a frequency conversion (e.g., Fourier transform) for the hologram data.

As described above, the hologram has characteristics closer to a frequency correlation than the spatial correlation of the 2D image. Therefore, if the 2D frequency conversion is applied to the hologram data, a data that is not the 2D image but has a spatial correlation higher than that of the hologram data may be acquired.

In detail, FIGS. 6A and 6B illustrate a result of applying a 2D fast Fourier transform (FFT) to the hologram data. The resolution conversion is applied to each partition region (PR). Here, a size of the partition region (PR) illustrated in FIG. 6B is larger than that of the partition region (PR) illustrated in FIG. 6A.

As illustrated in FIGS. 6A and 6B, the correlation between adjacent pixels is higher similar to the 2D image within a predetermined partition region (PR).

Accordingly, if the resolution conversion for the hologram (or hologram data) is required, the apparatus 100 for converting a hologram resolution may perform the interpolation (or sampling) in the frequency domain in which the frequency conversion is applied to the hologram (or hologram data), not in the hologram domain, and apply an inverse conversion to the hologram domain according to the performance result of the interpolation (or sampling). As a result, it is possible to perform the effective resolution conversion on the hologram (or hologram data).

At this time, the size of the partition region (PR) in which the characteristics similar to those of the 2D image are shown is changed depending on the pixel pitch, the wavelength, the reproduction distance, or the resolution of the hologram as illustrated in FIGS. 6A and 6B. In detail, the size of the partition region (PR) of which the border is partitioned to be shown like the small 2D image may be getting larger and larger as the pixel pitch is large, the wavelength is short, the reproduction distance is close, and the resolution is large.

Figure 7:
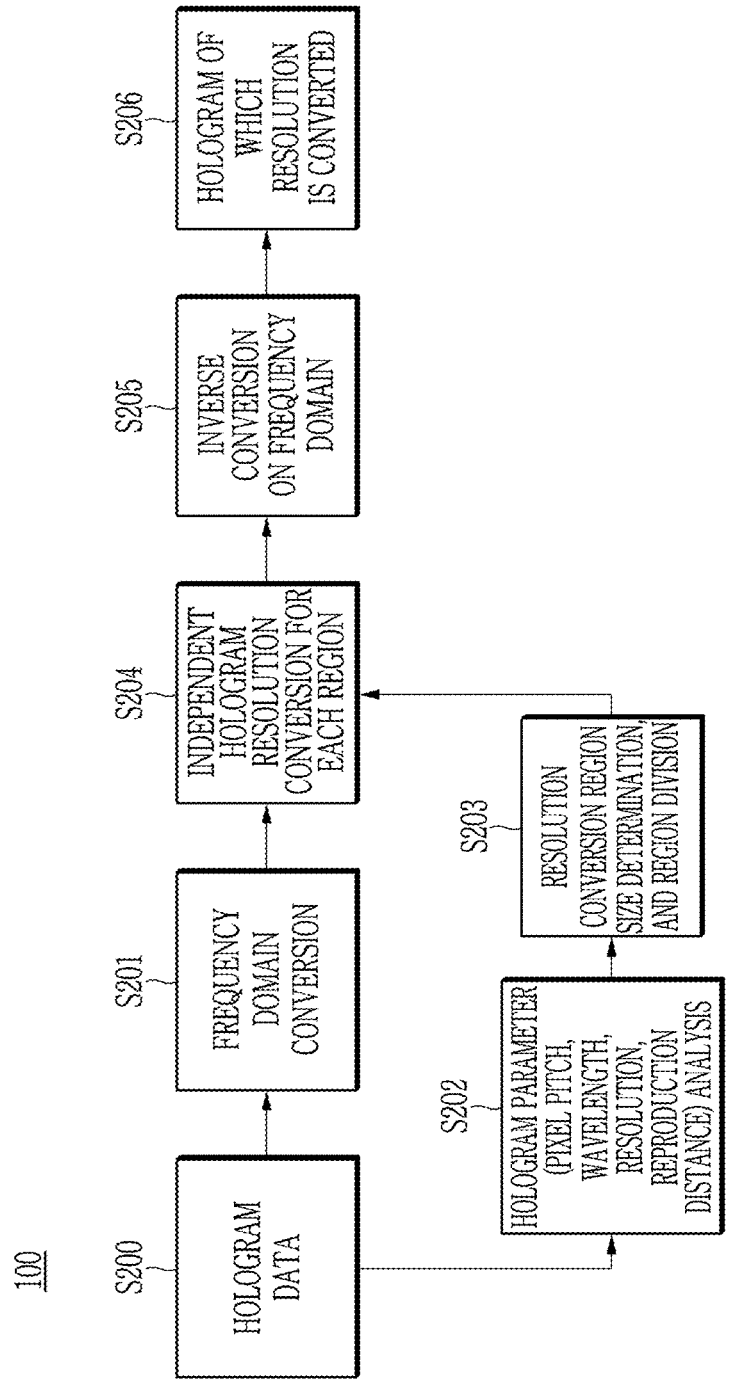
FIG. 7 is a diagram illustrating a method for converting a hologram resolution based on the frequency conversion (e.g., Fourier transform).

FIG. 7 is a diagram illustrating a method for converting a hologram resolution based on the frequency conversion (e.g., Fourier transform). In detail, FIG. 7 illustrates the case in which the apparatus 100 for converting a hologram resolution applies the frequency conversion to the hologram data and then partially performs the resolution conversion.

The apparatus 100 for converting a hologram resolution receives the hologram data (S200). Here, the hologram data is a data that includes all or some of complex field information on the hologram and may be a matrix data, a text data, or an image data.

The apparatus 100 for converting a hologram resolution applies the frequency conversion to the hologram data to convert the domain for the hologram data from the hologram domain into the frequency domain (S201). The apparatus 100 for converting a hologram resolution may use a general frequency conversion method (e.g., Fourier transform, or the like) applied to the 2D image for the frequency domain conversion.

The apparatus 100 for converting a hologram resolution may analyze hologram parameters (additional information or meta data) associated with the hologram data (S202). The hologram parameters (additional information or meta data) may include a resolution, a pixel pitch, a wavelength, a reproduction distance, or the like.

The apparatus 100 for converting a hologram resolution may determine the size of the partition region (PR) in which the resolution conversion after the frequency domain conversion is independently applied, based on the hologram parameters (e.g., pixel pitch, wavelength, reproduction distance, resolution, or the like) or the combination of the hologram parameters and a changed scale (S203). The apparatus 100 for converting a hologram resolution may divide the partition regions (PRs) included in the hologram data of the frequency domain depending on the size.

The apparatus 100 for converting a hologram resolution independently performs the hologram resolution conversion on each partition region (PR) (S204). In detail, to convert the resolutions of each of the partition regions (PRs) of the frequency domain, the apparatus 100 for converting a hologram resolution may use a general resolution conversion algorithm for the 2D image. Alternatively, to convert the resolutions of each of the partition regions (PRs) of the frequency domain, the apparatus 100 for converting a hologram resolution may also use the resolution conversion method (e.g., the resolution conversion method illustrated in FIG. 5, the resolution conversion method illustrated in FIG. 13, or the like) described in the present specification. The apparatus 100 for converting a hologram resolution may apply the resolution conversion to at least one of the partition regions (PRs).

The apparatus 100 for converting a hologram resolution again performs the inverse conversion on the domain for the hologram data of which the resolution is converted for each partition region (PR) from the frequency domain into the hologram domain (S205). In detail, the apparatus 100 for converting a hologram resolution may use a general frequency conversion method (e.g., Fourier inverse transform, or the like) applied to the 2D image for the frequency domain inverse conversion.

The apparatus 100 for converting a hologram resolution may finally output the hologram data of which the resolution is changed (S206). For example, the hologram data of which the resolution is changed may be finally represented in an input data form. The hologram data of which the resolution is changed may be finally transmitted to another apparatus.

Meanwhile, the apparatus 100 for converting a hologram resolution may determine the optimum value for the partition region (PR) by using the method similar to the method for determining an optimum value for an envelope direction and size described above in step (S203) of determining the sizes of each partition region (PR).

For example, the apparatus 100 for converting a hologram resolution may apply the resolution conversion based on candidate values for the sizes of the respective partition regions (PRs) to some or all of the hologram data of the frequency domain and determine the optimum value among the candidate values for the sizes of the partition regions (PRs) in consideration of the correlation between the image result numerically restored from the hologram of the origin resolution and the image result numerically restored from the hologram of which the resolution is converted.

That is, the apparatus 100 for converting a hologram resolution may determine the size of the partition regions (PRs) as the candidate value based on the hologram parameters (e.g., pixel pitch, wavelength, reproduction distance, resolution, or the like) and apply the resolution conversion based on the partition regions (PRs) to which the candidate values are applied to the hologram data. In addition, the apparatus 100 for converting a hologram resolution may restore the image by the numerical restoration for the hologram data to which the resolution conversion is applied. In addition, the apparatus 100 for converting a hologram resolution may restore the image by the numerical restoration for the origin hologram data. In addition, the apparatus 100 for converting a hologram resolution may change the size of the partition region (PR) based on the correlation between the restored images.

Figure 8:
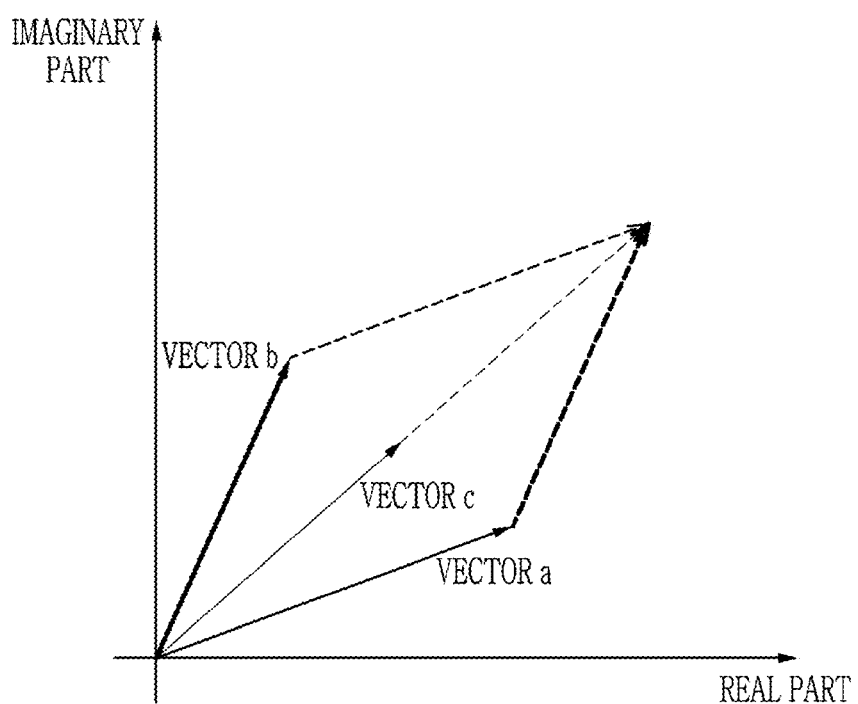
FIG. 8 is a diagram illustrating an average of two vectors.

FIG. 8 is a diagram illustrating an average of two vectors.

As described above, the hologram (or hologram data) is a complex data. Accordingly, the hologram (or hologram data) may be represented by a vector having a real part and an imaginary part as axes, respectively.

As illustrated in FIG. 8, an average of general vectors is equal to an independent average of the real parts and the imaginary parts. To use the average of the vectors, similarity between adjacent vectors is basically important. In this case, if the hologram data is represented by the vector, the similarity between adjacent vectors will be described.

Figure 9:
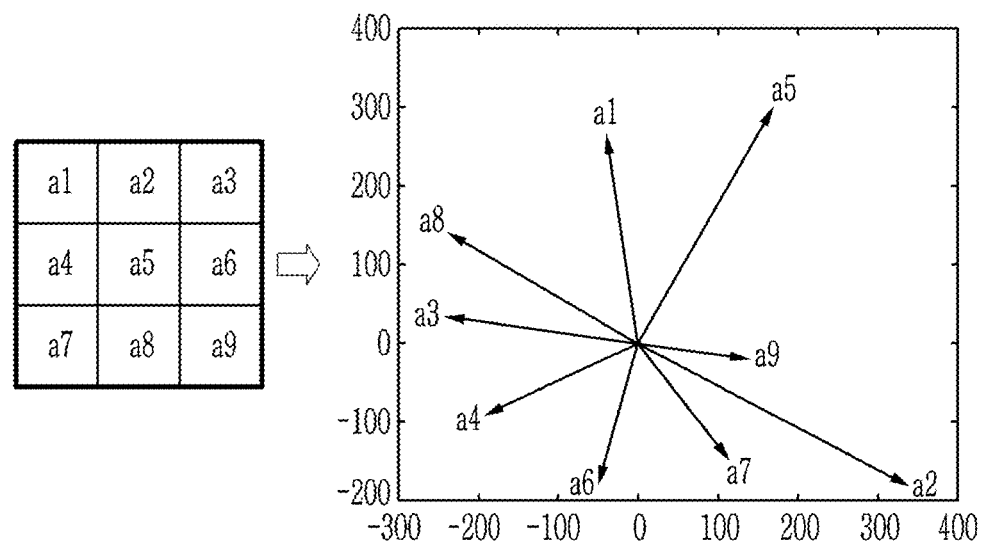
FIG. 9 is a diagram illustrating nine adjacent vectors of the hologram.
Figure 10:
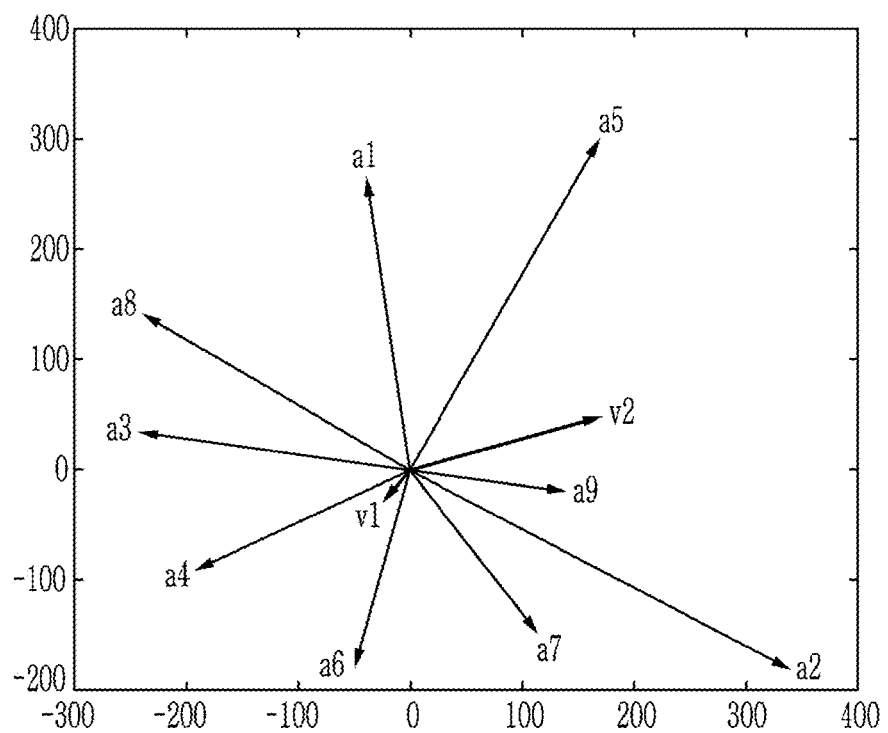
FIG. 10 is a diagram illustrating a method for predicting a center vector using an average of eight adjacent vectors.
Figure 11:
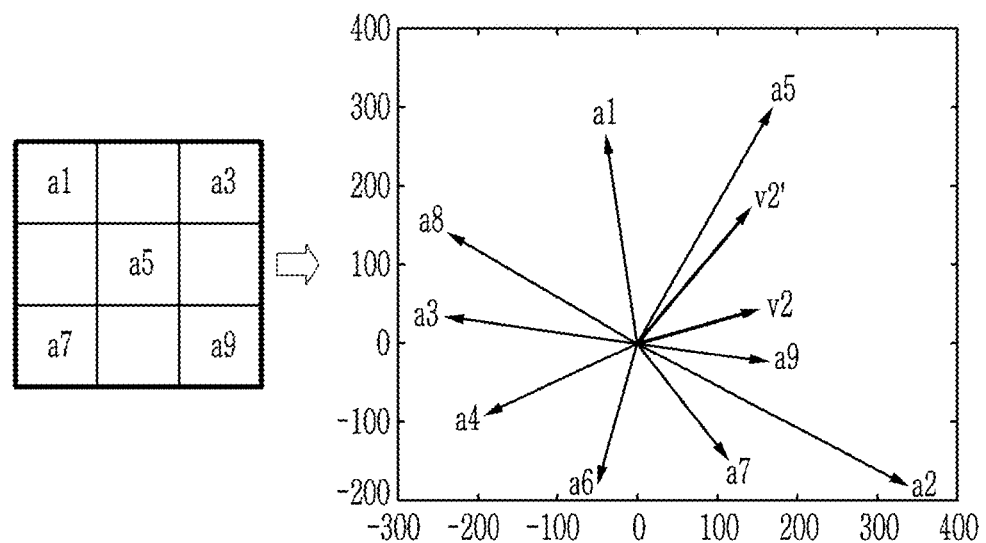
FIG. 11 is a diagram illustrating a method for predicting a center vector using an average of four adjacent vectors.

FIG. 9 is a diagram illustrating nine adjacent vectors of the hologram. FIG. 10 is a diagram illustrating a method for predicting a center vector using an average of eight adjacent vectors. FIG. 11 is a diagram illustrating a method for predicting a center vector using an average of four adjacent vectors.

In detail, FIG. 9 illustrates the case where nine adjacent pixels of the 2D hologram (or hologram data) is represented by a vector.

As illustrated in FIG. 9, the similarity between adjacent vectors is not high.

As a method for predicting a center vector from eight vectors representing eight pixels a1, a2, a3, a4, a6, a7, a8, and a9 around the center pixel a5, there is a method for obtaining an average of eight vectors.

For example, there is a method (hereinafter, 'method M10') for predicting a new vector in consideration of a real part and an imaginary part of adjacent vectors. In detail, the method M10 may predict a new vector V1 by independently averaging the real part and the imaginary part of the adjacent vectors.

The case where the method M10 uses the eight adjacent vectors a1 to a4 and a6 to a9 for the vector prediction is exemplified in the following Equation 1.

$$\text{real}(v1) = \{\text{real}(a1) + \text{real}(a2) + \text{real}(a3) + \text{real}(a4) + \text{real}(a6) + \text{real}(a7) + \text{real}(a8) + \text{real}(a9)\}/8$$

$$\text{imag}(v1) = \{\text{imag}(a1) + \text{imag}(a2) + \text{imag}(a3) + \text{imag}(a4) + \text{imag}(a6) + \text{imag}(a7) + \text{imag}(a8) + \text{imag}(a9)\}/8 \quad \text{(Equation 1)}$$

In the above Equation 1, real ( ) represents the real part of the pixel (or vector) and imag ( ) represents the imaginary part of the pixel (or vector).

However, as illustrated in FIG. 10, the vector v1 predicted by averaging the real parts and the imaginary parts of the eight adjacent vectors a1 to a4 and a6 to a9 is greatly different from the center vector representing the center pixel a5.

Unlike this, there is a method (hereinafter, 'method M20') for predicting a new vector in consideration of sizes (or strength and amplitude) and phases (or angles) of adjacent vectors (or pixels). In detail, the method M20 may average the sizes (or strength, amplitude) and the phases (or angles) of the adjacent vectors to predict a new vector v2.

The case where the method M20 uses the eight adjacent vectors a1 to a4 and a6 to a9 for the vector prediction is exemplified in the following Equation 2.

$$\text{abs}(v2) = \{\text{abs}(a1) + \text{abs}(a2) + \text{abs}(a3) + \text{abs}(a4) + \text{abs}(a6) + \text{abs}(a7) + \text{abs}(a8) + \text{abs}(a9)\}/8$$

$$\text{angle}(v2) = \{\text{angle}(a1) + \text{angle}(a2) + \text{angle}(a3) + \text{angle}(a4) + \text{angle}(a6) + \text{angle}(a7) + \text{angle}(a8) + \text{angle}(a9)\}/8$$

$$\text{real}(v2) = \text{abs}(v2) * \cos(\text{angle}(v2))$$

$$\text{imag}(v2) = \text{abs}(v2) * \sin(\text{angle}(v2)) \quad \text{(Equation 2)}$$

In the following Equation 2, abs( ) represents the size of the pixel (or vector), angle( ) represents the angle (or phase) of the pixel (or vector), real( ) represents the real part of the pixel (or vector), and imag( ) represents the imaginary part of the pixel (or vector).

As illustrated in FIG. 10, the vector v2 predicted by the method M20 is more similar to the center vector representing the center pixel a5 than the vector v1 predicted by the method M10.

However, in view of the accuracy, it is difficult to say that the vector v2 is the prediction vector for the vector a5.

To improve the prediction performance (or prediction accuracy), the method M20 may use some of the adjacent vectors for the vector prediction. For example, as illustrated in FIG. 11, a vector V2' acquired by averaging the sizes and the phases of the vectors a1, a3, a7, and a9 located in a diagonal direction among the adjacent eight vectors a1 to a4 and a6 to a9 having low similarity is more similar to the center vector representing the center pixel a5 than the vector v2 acquired by averaging the sizes and the phases of the eight adjacent vectors a1 to a4 and a6 to a9.

The new vector v2' may be obtained based on the following Equation 3.

$$\text{abs}(v2') = \{\text{abs}(a1) + \text{abs}(a3) + \text{abs}(a7) + \text{abs}(a9)\}/4$$

$$\text{angle}(v2') = \{\text{angle}(a1) + \text{angle}(a3) + \text{angle}(a7) + \text{angle}(a9)\}/4$$

$$\text{real}(v2') = \text{abs}(v2') * \cos(\text{angle}(v2'))$$

$$\text{imag}(v2') = \text{abs}(v2') * \sin(\text{angle}(v2')) \quad \text{(Equation 3)}$$

Figure 12:
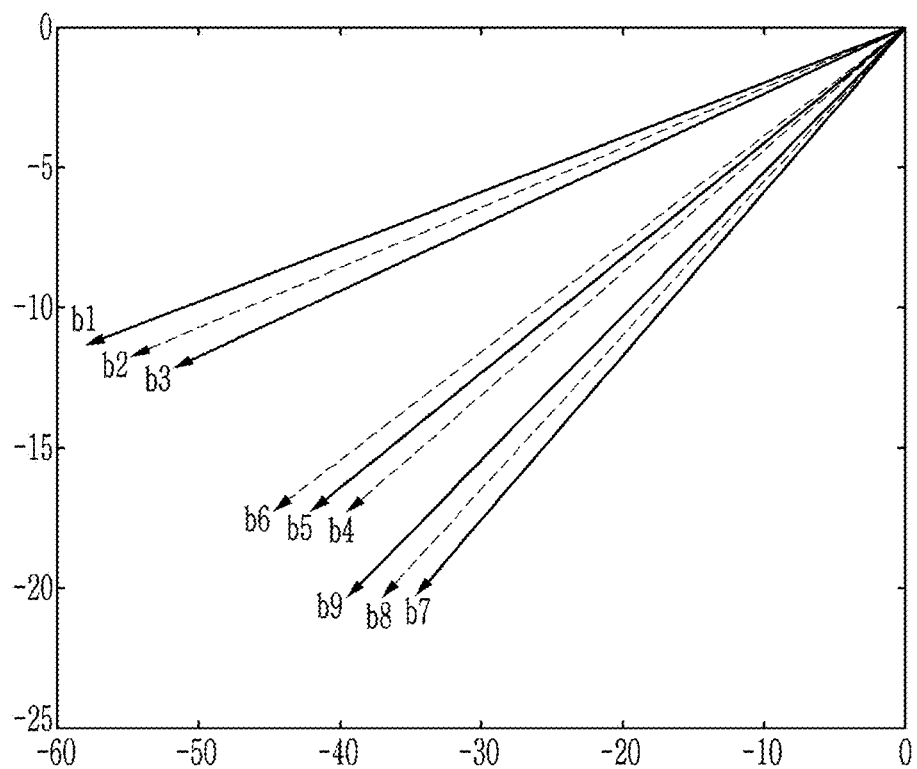
FIG. 12 is a diagram illustrating similarity of the hologram vector in a frequency domain (e.g., Fourier domain).

FIG. 12 is a diagram illustrating similarity of the hologram vector in a frequency domain (e.g., Fourier domain).

If the above-mentioned vector-based prediction is performed in the frequency domain, not in the hologram domain, as illustrated in FIG. 12, the similarity between the adjacent vectors is more improved. In this case, both of the method (e.g., method M10) for predicting a vector by independently averaging the real parts and the imaginary parts of the adjacent vectors and the method (e.g., method M20) for predicting a vector by averaging the sizes and the phases of the adjacent vectors have similar performance.

Even in the case of the similarity of the adjacent pixels, the vectors facing each other with respect to the center vector have higher similarity. For example, when a new vector is predicted based on some vectors b4 and b6 facing each other with respect to a vector b5 among the vectors b1 to b4 and b6 to b9, the similarity between the predicted vector and the vector b5 is high.

Accordingly, if the apparatus 100 for converting a hologram resolution performs the resolution conversion on the hologram (or hologram data) to which the frequency conversion is applied by using the above-mentioned vector-based prediction, the resolution conversion performance may be more improved.

Figure 13:
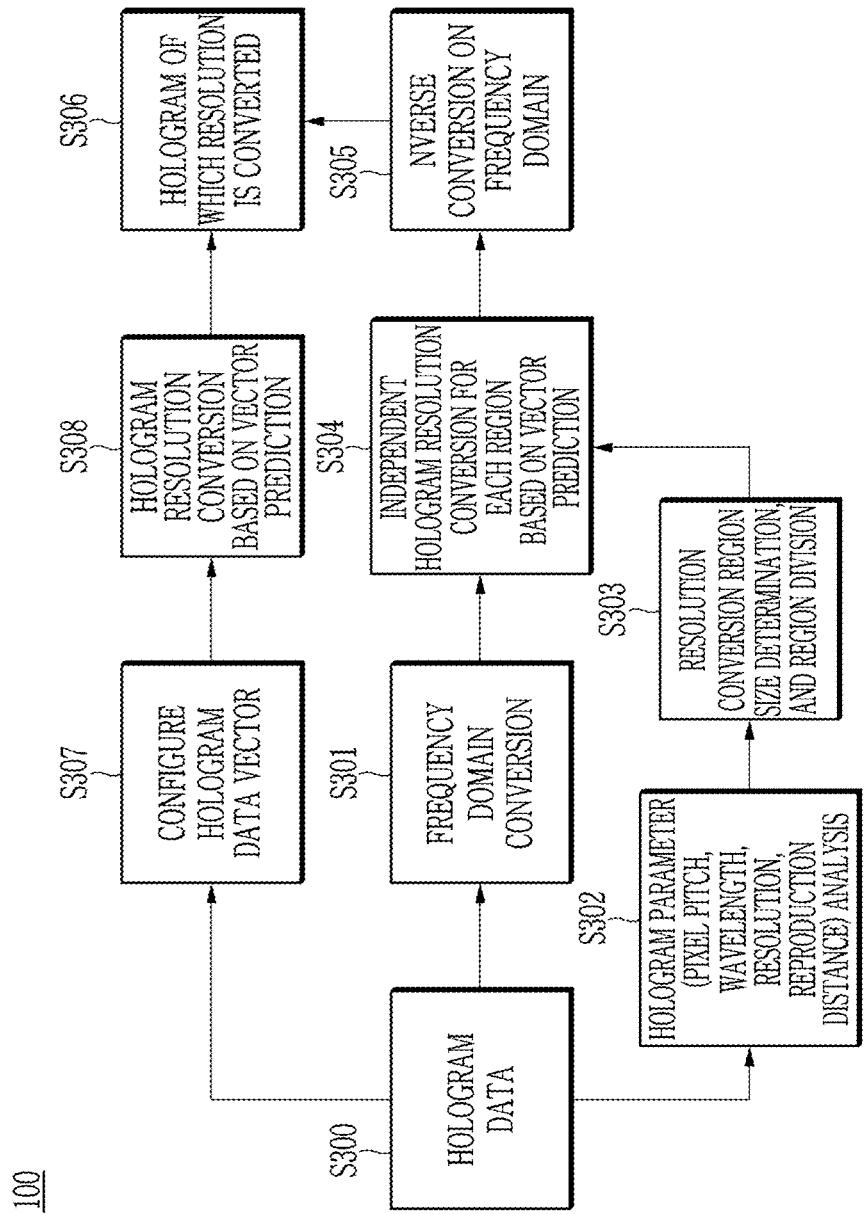
FIG. 13 is a diagram illustrating a method for converting a hologram resolution based on a vector prediction.

FIG. 13 is a diagram illustrating a method for converting a hologram resolution based on a vector prediction.

In detail, FIG. 13 illustrates the case where the apparatus 100 for converting a hologram resolution performs the hologram resolution conversion based on the vector prediction in the hologram domain or the frequency domain. In addition, the apparatus 100 for converting a hologram resolution may combine the hologram resolution conversion result in the hologram domain and the hologram resolution conversion result in the frequency domain.

In FIG. 13, the definition of the input data and the output data is as described above.

In FIG. 13, the frequency domain conversion method and the method for determining the size of the partition region (PR) to which the resolution conversion is applied is the same as or similar to the method described in FIG. 7. However, the method illustrated in FIG. 13 is different from the method illustrated in FIG. 7 in that the method for predicting a new vector based on the combination of the adjacent vectors is used for the hologram resolution conversion.

The method for performing, by the apparatus 100 for converting a hologram resolution illustrated in FIG. 13, the hologram resolution conversion in the hologram domain is as follows.

The apparatus 100 for converting a hologram resolution receives the hologram data (S300).

The apparatus 100 for converting a hologram resolution configures the hologram vectors using the hologram data (S307). For example, the apparatus 100 for converting a hologram resolution may configure the hologram vectors having the real part and the imaginary part of the hologram data as the axis component.

The apparatus 100 for converting a hologram resolution performs the hologram resolution conversion based on the above-mentioned vector prediction (S308). In detail, the apparatus 100 for converting a hologram resolution may apply the resolution converter based on the method M10 or the resolution conversion based on the method M20 to the hologram data.

The apparatus 100 for converting a hologram resolution may finally output the hologram data of which the resolution is changed (S306).

The method for performing, by the apparatus 100 for converting a hologram resolution illustrated in FIG. 13, the hologram resolution conversion in the frequency domain is as follows.

The apparatus 100 for converting a hologram resolution receives the hologram data (S300).

The apparatus 100 for converting a hologram resolution converts the domain for the hologram data for the hologram domain into the frequency domain (S301).

The apparatus 100 for converting a hologram resolution may analyze the hologram parameters (e.g., resolution, pixel pitch, wavelength, reproduction distance, or the like) associated with the hologram data (S302).

The apparatus 100 for converting a hologram resolution may determine the size of the partition region (PR) to which the resolution conversion is independently applied, based on the hologram parameters (e.g., pixel pitch, wavelength, reproduction distance, resolution, or the like) or the combination of the hologram parameters and the changed scale (S303). The apparatus 100 for converting a hologram resolution may divide the partition regions (PRs) included in the hologram data of the frequency domain depending on the size.

The apparatus 100 for converting a hologram resolution independently applies the hologram resolution conversion based on the above-mentioned vector prediction to each partition region (PR) (S304). To this end, the apparatus 100 for converting a hologram resolution may configure the hologram vectors using the hologram data of the frequency domain. For example, the apparatus 100 for converting a hologram resolution may use the above-mentioned method M10 or M20 for the resolution conversion.

The apparatus 100 for converting a hologram resolution again performs the inverse conversion on the domain for the hologram data of which the resolution is converted for each partition region (PR) from the frequency domain into the hologram domain (S305).

The apparatus 100 for converting a hologram resolution may finally output the hologram data of which the resolution is changed (S306).

Meanwhile, the apparatus 100 for converting a hologram resolution may determine which of adjacent vectors is used for the vector prediction based on a method similar to the method for determining optimum values for the envelope direction and size. For example, the apparatus 100 for converting a hologram resolution may apply the resolution conversion depending on the candidates of the vector combination used for the vector prediction only to some area of the entire hologram data, and determine the optimum vector combination among the candidates of the vector combination in consideration of the correlation between the numerically restored image result from the hologram of the origin resolution and the numerically restored image result from the hologram of which the resolution is converted.

That is, the apparatus 100 for converting a hologram resolution may determine the candidates of the vector combination to be used for the prediction of the new vector based on the hologram parameters (for example, resolution, pixel pitch, wavelength, reproduction distance, or the like). Further, the apparatus 100 for converting a hologram resolution may apply the resolution conversion based on the vector prediction to which the candidates of the vector combination is applied to the origin hologram data. In addition, the apparatus 100 for converting a hologram resolution may restore the image by the numerical restoration for the hologram data to which the resolution conversion is applied. In addition, the apparatus 100 for converting a hologram resolution may restore the image by the numerical restoration for the origin hologram data. In addition, the apparatus 100 for converting a hologram resolution may change the candidates of the vector combination based on the correlation between the restored images.

Figure 14:
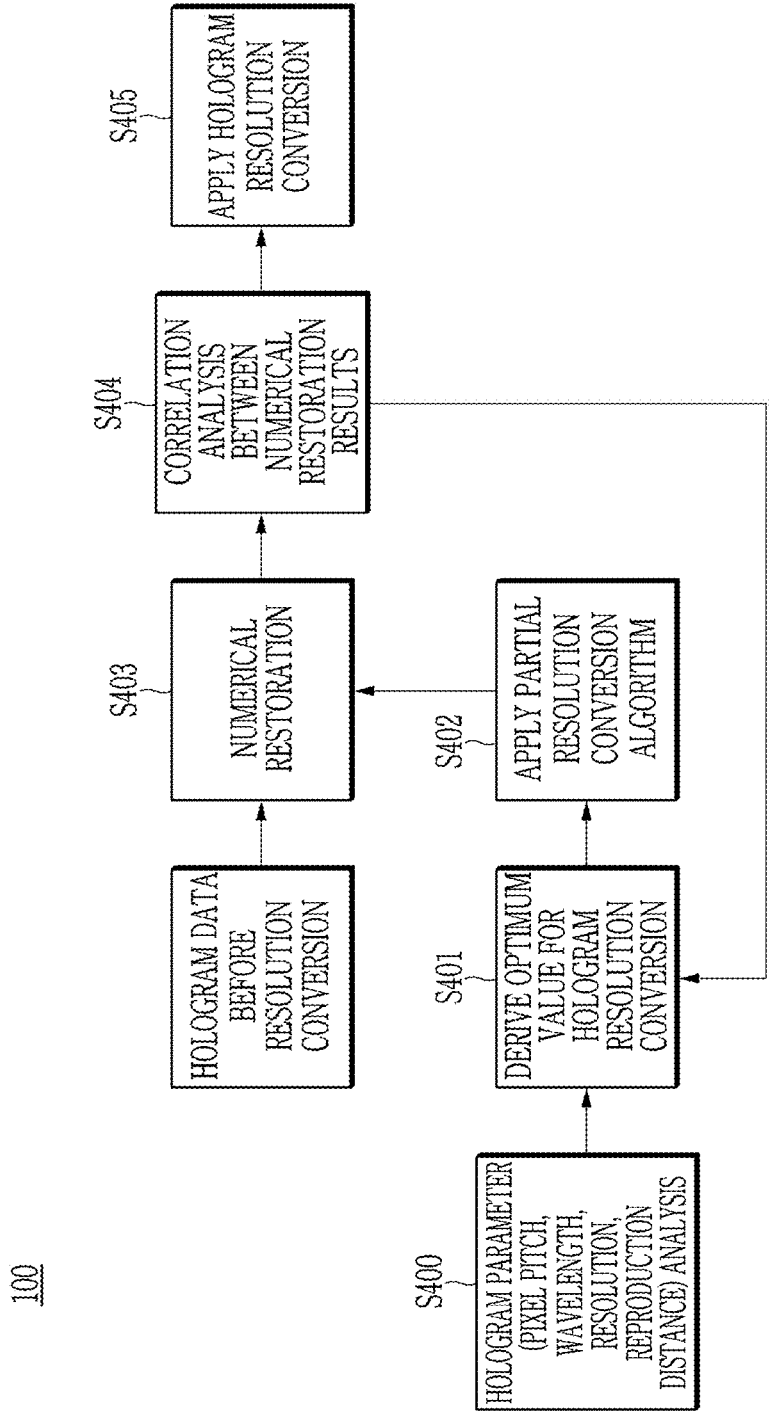
FIG. 14 is a diagram illustrating a method for deriving an optimum value of information for a hologram resolution conversion based on a correlation analysis of a numerically restored result.

FIG. 14 is a diagram illustrating a method for deriving an optimum value of information for a hologram resolution conversion based on a correlation analysis of a numerical restoration result.

The apparatus 100 for converting a hologram resolution may analyze the hologram parameters (e.g., resolution, pixel pitch, wavelength, reproduction distance, or the like) associated with the hologram data (S400).

The apparatus 100 for converting a hologram resolution may determine the candidate value of the information for the hologram resolution conversion based on the hologram parameters (e.g., resolution, pixel pitch, wavelength, reproduction distance, or the like) (S401). In detail, the information (hereinafter, 'first information') for the hologram resolution conversion may be the envelope direction and size illustrated in FIG. 5, the size of the partition region (PR) illustrated in FIG. 7, or the vector combination used for the vector prediction illustrated in FIG. 13.

The apparatus 100 for converting a hologram resolution performs the resolution conversion depending on the candidate value determined in the step S401 (S402). For example, the apparatus 100 for converting a hologram resolution may also apply the resolution conversion to the entire origin hologram data or apply the resolution conversion only to some area of the origin hologram data.

The apparatus 100 for converting a hologram resolution applies the numerical restoration to the hologram data (e.g., hologram data before the resolution conversion) of the origin resolution to restore the image (S403) and applies the numerical restoration to the hologram data of which the resolution is converted based on the step S402 to restore the image (S403).

The apparatus 100 for converting a hologram resolution may analyze the correlation between the image result numerically restored from the hologram data of the origin resolution and the image result numerically restored from the hologram data of the converted resolution (S404) to change the value of the first information. That is, the apparatus 100 for converting a hologram resolution may repeatedly perform the steps S401 to S404 to derive the optimum value of the first information. For example, the apparatus 100 for converting a hologram resolution may determine the value having the highest (best) correlation analyzed in the step (S404) among the candidate values of the first information as the optimum value of the first information.

The apparatus 100 for converting a hologram resolution may use the optimum value of the first information for the hologram resolution conversion (S405).

Meanwhile, the method for deriving an optimum value illustrated in FIG. 14 may be used for various technologies (e.g., signal processing technology) as well as the hologram resolution conversion.

Figure 15:
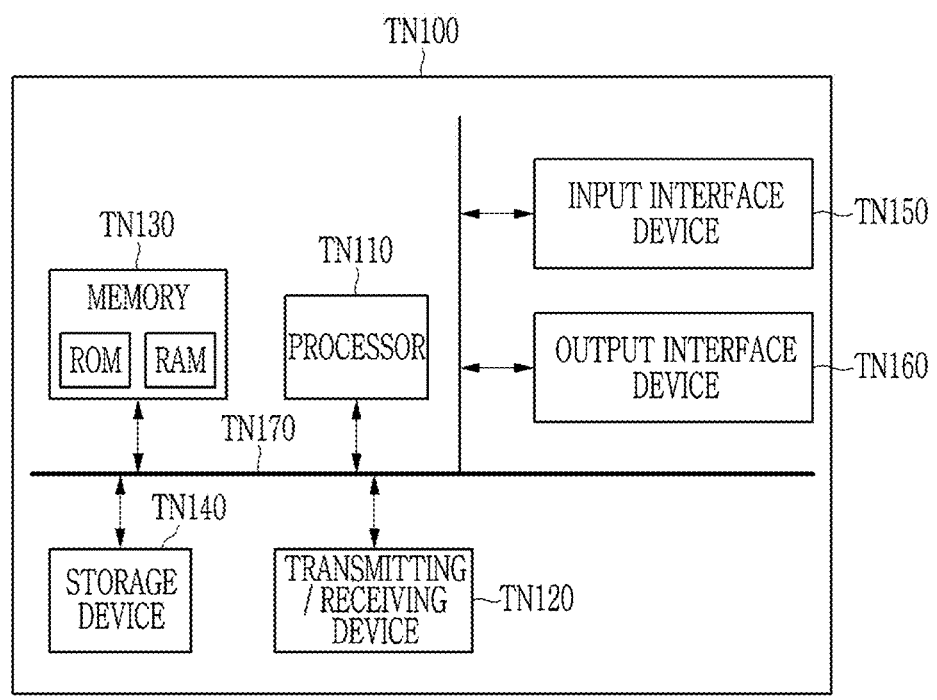
FIG. 15 is a diagram illustrating a computing apparatus according to an exemplary embodiment of the present invention.

FIG. 15 is a diagram illustrating a computing apparatus according to an exemplary embodiment of the present invention. A computing apparatus TN100 of FIG. 15 may be the apparatus 100 for converting a hologram resolution, or the like that is described in the present specification.

In the exemplary embodiment of FIG. 15, the computing apparatus TN100 may include at least one processor TN110 and memory TN130. In addition, the computing apparatus TN100 may further include a transmitting/receiving apparatus TN120 connected to a network to perform communications, a storage device TN140, an input interface device TN150, an output interface device TN160, or the like.

Components included in the computing apparatus TN100 may be connected to each other by a bus TN170 to communicate with each other.

The processor TN110 may run a program command that is stored in at least one of the memory TN130 and the storage device TN140. The processor TN110 may mean a central processing unit (CPU), a graphics processing unit (GPU), or an exclusive processor that performs the methods according to the exemplary embodiments of the present invention. The processor TN110 may be configured to implement the procedures, the functions, and the methods described with reference to the exemplary embodiment of the present invention. The processor TN110 may control each of the components of the computing apparatus TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A method for converting a hologram resolution of an apparatus for converting a hologram resolution, comprising:
receiving hologram data having a first resolution;
configuring a plurality of hologram vectors each having a real part and an imaginary part of the hologram data; and
performing a resolution conversion by using a vector prediction method for predicting a new hologram vector using sizes and angles of the plurality of hologram vectors, wherein the new hologram vector is a center vector corresponding to a center pixel, and the plurality of hologram vectors are a plurality of adjacent vectors corresponding to a plurality of adjacent pixels surrounding the center pixel,
wherein the vector prediction method obtains a first average value by averaging the sizes of only some of the plurality of adjacent vectors, obtains a second average value by averaging the angles of the some of the plurality of adjacent vectors, and obtains a real part and an imaginary part of the new hologram vector based on the first average value and the second average value.

2. The method of claim 1, wherein:
the performing of the resolution conversion includes
determining a hologram vector combination for predicting the new hologram vector among the plurality of hologram vectors.

3. The method of claim 2, wherein:
the determining of the hologram vector combination includes
determining a first hologram vector combination based on first information associated with the hologram data;
applying a first resolution conversion based on the vector prediction method to which the first hologram vector combination is applied to the hologram data having the first resolution; and
restoring a first image based on a numerical restoration for the hologram data to which the first resolution conversion is applied.

4. The method of claim 3, wherein:
the determining of the hologram vector combination further includes restoring a second image based on a numerical restoration for the hologram data having the first resolution; and
determining a second hologram vector combination based on a correlation between the first image and the second image.

5. The method of claim 1, wherein:
the configuring of the plurality of hologram vectors includes
converting a domain for the hologram data from a hologram domain into a frequency domain by applying a frequency conversion to the hologram data; and
the performing of the resolution conversion includes
applying the resolution conversion to each of partition regions included in the hologram data of the frequency domain, wherein the partition region is a region in which the resolution conversion after the frequency conversion is independently applied.

6. The method of claim 5, wherein:
the performing of the resolution conversion further includes
determining sizes of the partition regions based on first information associated with the hologram data.

* * * * *